United States Patent
DeNatale et al.

(10) Patent No.: US 7,619,485 B2
(45) Date of Patent: Nov. 17, 2009

(54) COMPACT OPTICAL ASSEMBLY FOR CHIP-SCALE ATOMIC CLOCK

(75) Inventors: Jeffrey Frank DeNatale, Thousand Oaks, CA (US); Robert Ladd Borwick, III, Thousand Oaks, CA (US); Philip A. Stupar, Oxnard, CA (US); Chialun Tsai, Thousand Oaks, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 111 days.

(21) Appl. No.: 11/669,251

(22) Filed: Jan. 31, 2007

(65) Prior Publication Data

US 2009/0251224 A1 Oct. 8, 2009

(51) Int. Cl.
*H03L 7/26* (2006.01)
*H01S 1/06* (2006.01)
(52) U.S. Cl. .................................... 331/94.1; 331/3
(58) Field of Classification Search .............. 331/3, 331/94.1
See application file for complete search history.

(56) References Cited

U.S. PATENT DOCUMENTS

| | | | | |
|---|---|---|---|---|
| 5,696,750 | A * | 12/1997 | Katayama | 369/112.06 |
| 5,703,862 | A * | 12/1997 | Lee et al. | 369/112.26 |
| 6,900,702 | B2 * | 5/2005 | Youngner et al. | 331/94.1 |
| 7,359,059 | B2 * | 4/2008 | Lust et al. | 356/459 |

* cited by examiner

*Primary Examiner*—Robert Pascal
*Assistant Examiner*—Levi Gannon
(74) *Attorney, Agent, or Firm*—Glenn H. Lenzen (57) ABSTRACT

Provided is a chip-scale atomic clock having a folded optic configuration or physics package. In particular, the physics package includes a vapor cell for containing gaseous alkali atoms and a VCSEL for generating a laser light One or more heating elements are positioned to simultaneously heat both the vapor cell and VCSEL to the required operating temperature. A micro-lens element, positioned between the VCSEL and a reflector, is used to first expand the beam of light, and then to subsequently collimate the light after it is once reflected. Collimated, reflected light passes through the vapor cell wherein the alkali atoms are excited and a percentage of the reflected light is absorbed. A detector, located opposite the reflector and micro-lens array, detects light passing through the cell. An error signal is generated and the output voltage of a local voltage oscillator is successively stabilized.

37 Claims, 5 Drawing Sheets

COMPACT OPTICAL ASSEMBLY FOR CHIP-SCALE ATOMIC CLOCK

This invention was made with Government support under contract N66001-02-C-8025 awarded by the Department of the Navy Space & Naval Warfare Systems Command (SPAWAR) on behalf of the Defense Advanced Research Projects Agency (DARPA) Microsystems Technology Office (MTO). The Government has certain rights in this invention.

FIELD OF THE INVENTION

This invention relates generally to atomic clocks. More particularly, to a chip-scale or micro-fabricated atomic clock having a folded optics or compact optical assembly.

BACKGROUND

Atomic clocks and precision timing devices are an integral part of GPS (Global Positioning System) and GNSS (Global Navigation Satellite System) devices, as well as cellular telephone systems, secure communication protocols, distributed networks, etc. As the sophistication of these systems continues to improve, and data rates continue to increase, the demand for smaller, lower power, more compact timing devices increases as well. Whereas a volumetric footprint of 100 $cm^3$ was once considered more than acceptable for a physics package of an atomic clock, future devices, especially portable devices, will require a timing device ten to one-hundred times smaller than this size.

Efforts are ongoing in the development of such a compact, low-power time/frequency standard ("Chip-Scale Atomic Clock," or CSAC). There are a number of approaches that may be taken to create a CSAC based on various optical and/or microwave excitation techniques. One such approach, known as Coherent Population Trapping (CPT) uses a single optical source modulated at microwave frequencies to generate the atomic states which can serve as frequency references. Other approaches use microwave excitation and optical interrogation in their operation. At the heart of the CSAC is the hardware assembly to create and interrogate the optical frequency reference known as the physics package. Consider for a moment the physics package 100 for a typical CPT-based CSAC system presented in FIG. 1. As with many prior art systems, the physics package is arranged in a linear fashion with a vertical cavity surface emitting laser ("VCSEL") 102 spaced significantly apart from a vapor cell 104 and a photodiode which is a detector 106. As can be appreciated by those skilled in the art, the VCSEL 102 generates a beam of light which illuminates and interrogates alkali atoms contained within the vapor cell 104 Multiple window heaters, e.g. heaters 108 and 110, are used to heat both vapor cell 104 and VCSEL 102.

Figure 1:
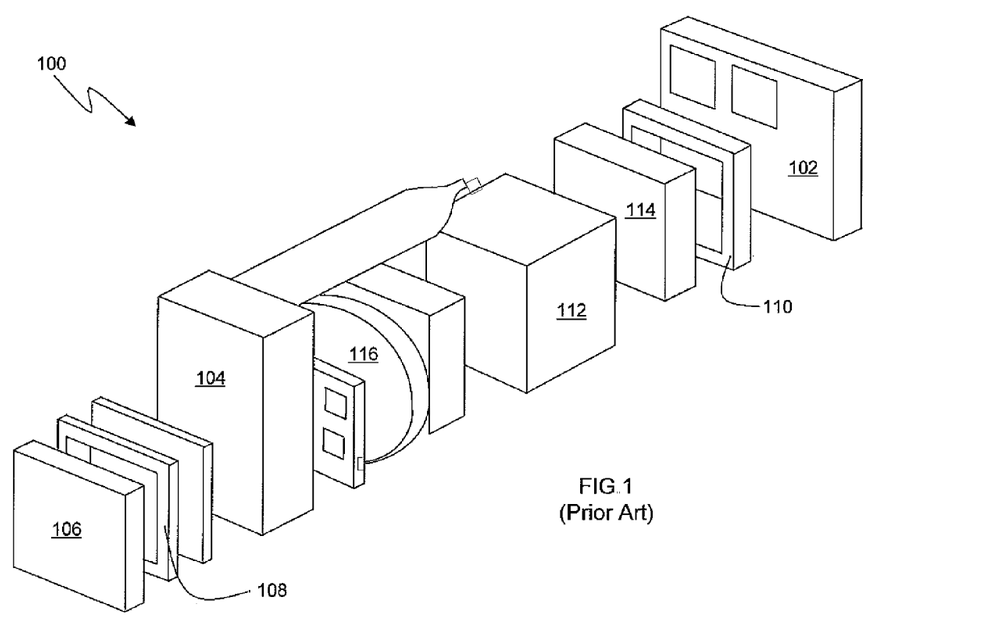
FIG. 1 is a perspective representation of a prior art of chip-scale atomic clock.

Given the size constraints of the optics (lens) 112 in this prior art system, a relatively long path length is required to achieve a beam width of 2 mm or more. A wide beam width (on the order of 2 mm) is required to ensure a sufficient volume of gaseous atoms contained in the vapor cell 104 is illuminated and excited. Other components such as the ND filter 114 and the waveplate 116 only add to the overall physics package size.

There are a number of limitations with many of the atomic clock/physics packages known in the prior art. As noted above, substantially longer path lengths are required to achieve a proper light beam diameter. Longer path lengths equate to larger volumes, which are unsuited for many handheld portable devices. Further, physical separation of the VCSEL from the vapor cell can require multiple heaters, which may be an inefficient method of heating that consumes an undue amount of power. Therefore, controlling the heating of the VCSEL and vapor cell to ensure consistent and stabilized temperature operations with low operating power can be very difficult.

For these reasons and others, many atomic clock designs now employ a "folded" optics configuration, wherein components are co-located and/or efficiently positioned to reduce volume and power consumption. For example, in many prior art systems the VCSEL and photodiode detector are co-located on a single chip or board. These systems may further reduce path length by utilizing one or more reflectors to redirect light through the vapor cell, thereby minimizing the overall path length. While these systems (atomic clocks) may offer some improvement over more traditional systems, they still have performance issues. Such a configuration may require a custom VCSEL/detector element, and the optical arrangement can result in non-uniform intensity and polarization of light passing through the vapor cell, which can compromise ultimate performance.

Hence there is a need for an atomic clock having a folded optics configuration to address one or more of the drawbacks identified above.

SUMMARY

The compact optical assembly and atomic clock herein disclosed advance the art and overcome problems articulated above by providing a compact, folded optics chip-scale atomic clock design while preserving high-performance operation.

In particular, and by way of example only, according to an embodiment, provided is a chip-scale atomic clock, including: a vapor cell containing alkali atoms; a vertical-cavity surface emitting laser ("VCSEL") positioned in close proximity to the vapor cell; at least one heater element positioned between the VCSEL and the vapor cell; a reflector; a dual-focus optical element structured and arranged to both direct light from the VCSEL toward the reflector and to collimate once reflected light; elements to control the intensity and polarization of the light; and a detector structured and arranged to detect the once reflected light passing through the vapor cell to excite the alkali atoms.

In another embodiment, provided is a method for manufacturing an atomic clock including: selecting a vapor cell containing alkali atoms; connecting at least one heater to a first end of the vapor cell; interfacing a vertical cavity surface emitting laser ("VCSEL") with the first end of the vapor cell and the at least one heater; positioning a reflector in close proximity to the VCSEL to reflect light from the VCSEL into the vapor cell; locating a dual-focus optical element between the VCSEL and the reflector to both direct the light toward the reflector and to collimate once reflected light; and mounting a detector in close proximity to a second end of the vapor cell to detect the reflected light passing through the vapor cell to excite the alkali atoms.

In still another embodiment, provided is a physics package for an atomic clock including: a containing means for containing a plurality of alkali atoms; a generating means for generating a laser light: a heating means positioned between the generating means and the containing means, for heating the generating means and the containing means; a reflecting means for reflecting the laser light toward the containing means; a collimating means for directing the laser light toward the reflecting means and for collimating the reflected laser light; and a detecting means for detecting the laser light passing once through the containing means to excite the alkali atoms.

In yet another embodiment, provided is a dual-focus optical element for a compact optical clock, including: a first section for producing a beam expansion of a beam light striking the element; a reflector; and a second section for collimating the beam of light directed toward the second section by the reflector.

DETAILED DESCRIPTION

Before proceeding with the detailed description, it should be noted that the present teaching is by way of example, not by limitation. The concepts herein are not limited to use or application with one specific type of chip-scale atomic clock. Thus, although the instrumentalities described herein are for the convenience of explanation, shown and described with respect to exemplary embodiments, the principles herein may be equally applied in other types of chip-scale atomic clocks.

Figure 2:
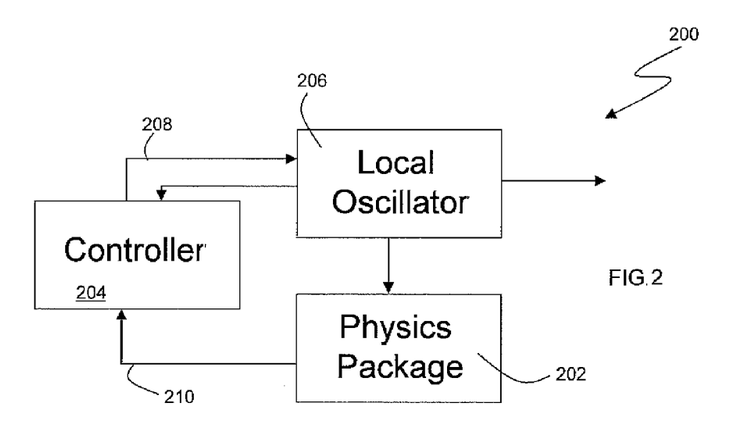
FIG. 2 is a plan view of a simplified atomic clock system, according to an embodiment.

Referring now to FIG. 2, a simplified schematic of the system level "architecture" of the present disclosure, to wit an optical or atomic clock 200, is presented. In particular, the compact optical assembly or physics package 202, which is the functional element used to establish the necessary and stabilized timing frequency, is interconnected electrically to both a controller 204 or micro-controller and a frequency modulation source, such as a local oscillator or voltage controlled oscillator ("VCO") 206. The components 202-206 are structured and arranged such that controller 204 establishes and ultimately locks the frequency of VCO 206 via control signals represented by arrow 208. Specifically, control signal 208 is an error correction sent to VCO 206 based on the output signal 210 received from physics package 202, as discussed in greater detail below. In summary, the output 210 of physics package 202 derives from a comparison of the output frequency of VCO 206 and the atomic resonant frequency generated within physics package 202. In the closed-loop system described, as the delta between the VCO output 206 and the atomic frequency (based on the atomic transition of excited alkali atoms) decreases, the atomic clock 200 approaches the accuracy and stability necessary to function properly.

Figure 3:
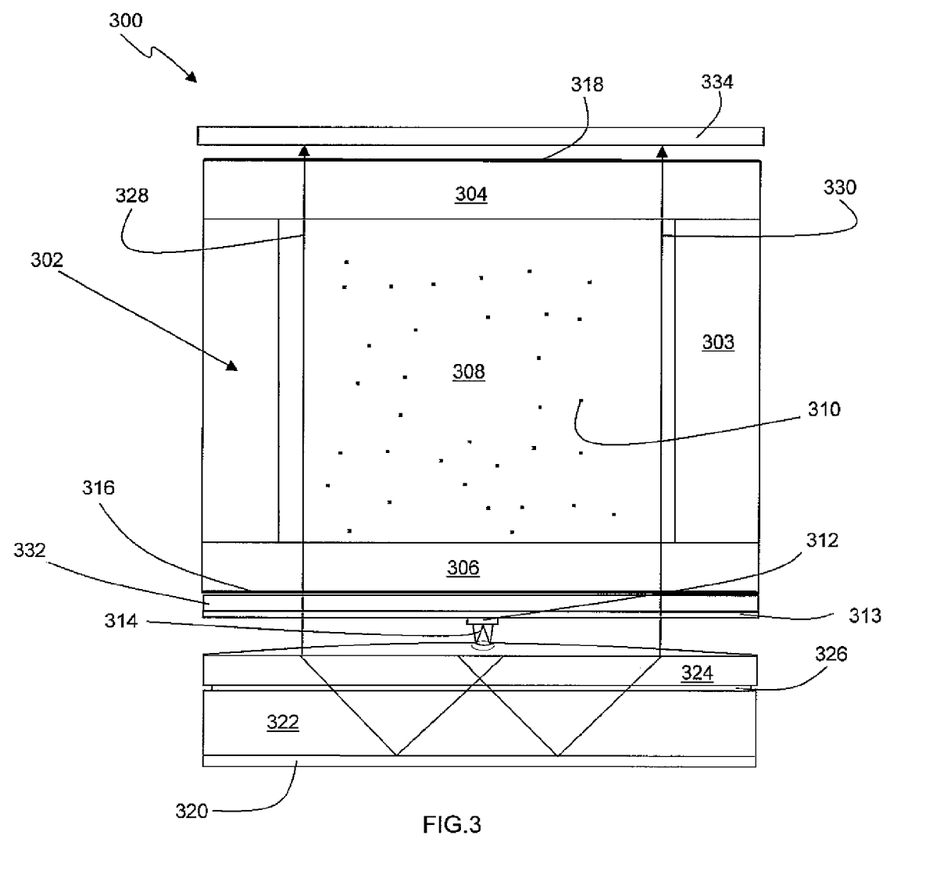
FIG. 3 is a plan view of a physics package of a chip-scale atomic clock, according to an embodiment.

Considering now FIG. 3, a compacted or "folded" physics package 300 for use in an atomic clock (such as atomic clock 200 in FIG. 2) is provided. Integral to physics package 300 is a vapor or resonance cell 302. In at least one embodiment, vapor cell 302 is manufactured using silicon to form the walls of the cell, e.g. wall 303. In yet another embodiment, other alkali resistant materials may be used in lieu of silicon. Vapor cell 302 may include two substantially transparent, at operating wavelengths, windows 304 and 306, which may be Pyrex®. As shown in FIG. 3, windows 304 and 306 are positioned opposite one another and separated by a center section or cavity 308 of cell 302. The windows 304, 306 in conjunction with the walls of cell 302, e.g. wall 303, form a containment vessel for encapsulating a concentration of gaseous alkali atoms 310. It may be said, therefore, that the windows 304, 306, like the walls of cell 302, are alkali resistant. In one embodiment, the alkali atoms are cesium, and in yet another embodiment the alkali atoms may be rubidium. It can be appreciated, however, that other atoms having the necessary atomic structure and excitation characteristics may be used without departing from the scope and intent of this disclosure. Also contained within cavity 308 are inert buffer gases (not shown) which may be (but are not limited to) nitrogen, argon, or neon.

Still referring to FIG. 3, an optical source which may be a vertical cavity surface emitting laser ("VCSEL") 312 is mounted to a support surface 313 in close proximity to window 306. VCSEL 312 may be mounted by any one of several techniques known in the art, to include bonding, for mechanically fastening or joining two components. Of note, the mounting scheme selected must ensure the thermal conductivity between vapor cell 302 and VCSEL 312 is maintained. In one embodiment, a separate transparent substrate, e.g. 313, is used to support the VCSEL In another embodiment, the vapor cell window itself may be used as the VCSEL support. VCSEL 312 is positioned such that an output aperture 314 of VCSEL 312 is oriented or directed away from vapor cell 302. Stated differently, any laser light emitted by VCSEL 312 will not directly strike or pass through vapor cell 302 unless that light is subsequently reflected.

Positioned on, integral to, or thermally in contact with window 306 are one or more heating elements or heaters, of which heating element 316 is exemplary. The heating elements, e.g. heating element 316, are structured and arranged to simultaneously heat both vapor cell 302 and VCSEL 312 to a predetermined and required temperature or temperature range. By substantially co-locating vapor cell 302 and VCSEL 312, and positioning a heating element 316 in thermal contact with both, the physical dimensions of physics package 300, and hence the atomic clock, are minimized. Further, overall system level power consumption is reduced as a single heating element 316, or a single array of heating elements, can heat both components (302, 312), thereby eliminating the need for multiple heaters. Depending on the relative temperatures desired for the vapor cell 302 and VCSEL 312, a separate heater element may be incorporated for one or the other to fine-tune the individual component temperature over a narrow range, with the bulk of the heating provided by the common (shared) heater. Temperature stability, minimized package volume, and reduced power consumption are three advantages recognized through the integration of a single heating element. In one embodiment, heating element 316 is a transparent conductor (resistive heater) formed using transparent conductive materials, such as Zinc Oxide or Indium Tin Oxide. Regardless, heating element 316 is substantially transparent to allow the transmission of laser light through window 306 and into cavity 308. In another embodiment, the heaters may use opaque materials, such as resistive metal heaters, and be located outside the clear aperture of a vapor cell window. For either embodiment, the heaters may be on separate substrates or fabricated directly on a vapor cell window.

In at least one embodiment, a second heating element 318, or array of heating elements, may be positioned between window 304 and a photodetector 334 to provide additional heating capacity and stability. In this configuration, heating elements 316 and 318 may be "½" heaters. Using ½ heaters, the overall power savings realized through the use of a single heating element (e.g. element 316) is maintained while the system level temperature stability goals are still met. Additionally, more uniform heating may be realized as heat is applied to the encapsulated alkali atoms from both a "top" and a "bottom" position.

Optically aligned with VCSEL 312 is a reflector 320. Reflector 320 may be any of a type well known in the art for reflecting light generated by a laser diode, such as VCSEL 312. Reflector 320 is positioned a predetermined and fixed distance from aperture 314, and is oriented to reflect light generated by VCSEL 312 into vapor cell 302. The precise spacing and orientation of reflector 320 is determined, in part, by the lens configuration employed in physics package 300, as discussed in greater detail below. In at least one embodiment, a spacer 322 is used to properly distance reflector 320 from VCSEL 312 and an associated dual-focus optical element 324. Also, an intensity control element, which may be a neutral density or ND filter 326 may be used to reduce the energy level of the light beams entering vapor cell 302. A polarization control element or device, such as a quarterwaveplate 332, may be used to control the polarization state of the light passing through the vapor cell.

Turning now to the dual-focus optical element 324, as shown in FIG. 3 the element 324 is optically aligned with aperture 314 of VCSEL 312, and is integrated between VCSEL 312 and reflector 320. Dual-focus optical element 324 is structured and arranged to both direct light received from VCSEL 312 toward reflector 320, and to subsequently collimate and direct reflected light, e.g. light beams 328 and 330, into cavity 308 of vapor cell 302. In at least one embodiment, the dual-focus optical element 324 is an axially symmetric optic.

Figure 4:
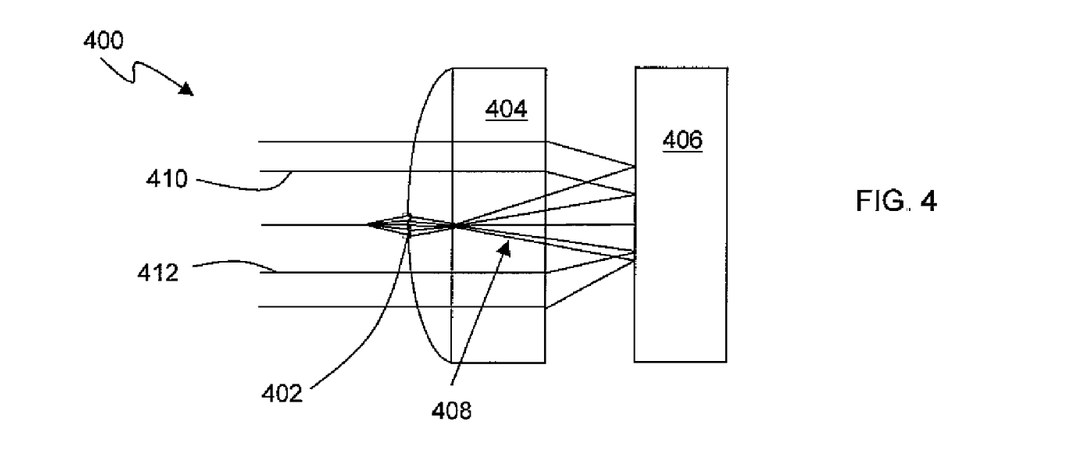
FIG. 4 is plan view of a dual-focus, axially symmetric optic, specifically a micro-lens on mini-lens, according to an embodiment.

Cross-referencing for a moment FIGS. 3 and 4, one implementation of a dual-focus axially symmetric optical element 400 is presented. In one embodiment, optic 400 includes a section of the optical element 400 which may be a refractive micro-lens 402 incorporated into a mini-lens 404 (a micro-mini lens assembly). Based on the radius of curvature ("ROC") of micro-lens 402, light striking the lens assembly will be refracted toward a reflector (e.g. reflector 320 in FIG. 3 and reflector 406 in FIG. 4) with a known distribution or beam expansion pattern, such as pattern 408 in FIG. 4. It can be appreciated that micro-lens 402 may be concave or convex depending on the overall component design of the dual-focus axially symmetric optic 400. Further, micro-lens 402 may be diffractive This micro-lens serves to more rapidly expand the transmitted light beam to reduce the propagation distance necessary to reach the desired beam diameter. Reflected light, of which light beams 410 and 412 are exemplary, is collimated as a result of passing back through a second section of optical element 400, which may be a mini-lens 404, in route to vapor cell 302. Of note, the larger ROC of mini-lens 404 provides for the light collimation necessary to properly interrogate or illuminate substantially all of the volume of cavity 308. Mini-lens 404 may be: a diffractive mini-lens, a refractive mini-lens, a Fresnel mini-lens, and a kiniform mini-lens. Micro-lens 402 and mini-lens 404 may be manufactured from materials which include glass, ceramic and various polymer compound materials.

Figure 5:
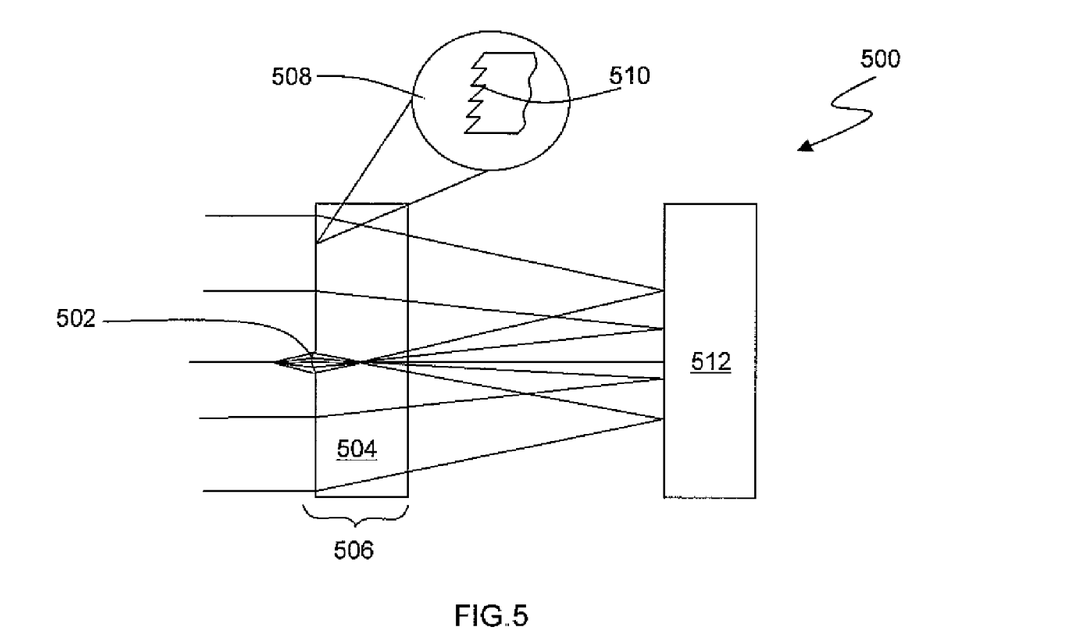
FIG. 5 is plan view of a dual-focus, axially symmetric optic, specifically a hybrid Fresnel lens, according to an embodiment.

In yet another embodiment of a dual-focus axially symmetric optic 500, as shown in FIG. 5, a micro-lens 502 is integrated with a Fresnel lens 504 to form a hybrid Fresnel lens element or lens assembly 506. As shown in the exploded view 508 of Fresnel lens 504, the lens 504 may have a "stair step" or "saw tooth" surface pattern 510. The surface pattern 510 is defined in concert with the shape and ROC of micro-lens 502 to provide the desired optical focusing properties of optic 500. As with the optic 400 in FIG. 4, the micro-lens 502 may be either concave or convex. Light reflecting off a reflector, e.g. reflector 512, is once again collimated prior to reaching vapor cell 302. Whether symmetrical or asymmetrical, the hybrid lens element, e. g. element 506, may be fabricated using various techniques, to include but not limited to reflow microlens processing, grayscale lithography, and fine-scale mechanical turning While a number of embodiments of the dual-focus optic have been shown as examples, these are not intended to limit the scope of the invention. Other approaches to both the beam expansion and beam collimation may be implemented by those skilled in the art.

Returning again to FIG. 3, a polarization control element (such as waveplate) 332 is positioned in a region of substantially collimated light between dual-focus optical element 324 and vapor cell 302. More specifically, waveplate 332 is structured and arranged such that light emitted from VCSEL 312 does not pass through waveplate 332, however, light once reflected off reflector 318 passes through waveplate 332 in route to cell 302. In at least one embodiment, waveplate 332 is an annular, two-layer quarter waveplate. As the light, e.g. light beams 328 and 330, passes through waveplate 332, the light is circularly polarized prior to illuminating gaseous atoms in cavity 308. In another embodiment, the waveplate may be located between the vapor cell 302 and VCSEL support 313, as shown in FIG. 3.

An intensity control element (such as neutral density filter 326) may be used to reduce the intensity of the VCSEL 312 illumination. This may be located between the dual-focus optical element 324 and the reflector 320. In this configuration, the dual-pass of the optical beam through the ND filter 326 can reduce the physical thickness needed to obtain a given level of optical attenuation. In one embodiment the dimensions of the dual-focus optical element 324 and the ND filter 326 are chosen to permit direct bonding of the ND filter 326 to the optical element and metallization of the ND filter 326 back surface to serve as the reflector 320. In this configuration, the bonded optical element reduces the number of parts involved in the physics package assembly. The bonding of these elements with properly selected optical adhesives can reduce the amount of reflected energy at air/glass surfaces and reduce the need for antireflective coatings.

A detector or photodetector 334 is positioned to receive or detect light beams passing through vapor cell 302, and more specifically cavity 308. As is discussed in greater detail below, light passing through cavity 308 interrogates gaseous alkali atoms 310 encapsulated in the cavity 308. As a result, a certain amount of the passing light is absorbed, based on the frequency or wavelength of the light. Detector 334 is in close proximity to window 304 such that light passing out of vapor cell 302 through window 304 strikes detector 334. Detector 334 may be any of a type of photo-detector well known in the art for detecting laser light.

While an axially symmetric optical configuration is shown in FIG. 3 for simplicity, the essential features of the present invention can be implemented in non-axially symmetric configurations as well. For example, an optical source can be placed at locations other than the center of the cell aperture (and even outside the aperture), and the light may be directed through reflection into the vapor cell using a prism in place of a plane parallel reflector. In this configuration, the dual-focus optic would similarly have a non axially symmetric arrangement of the microlens and minilens elements.

Figure 6:
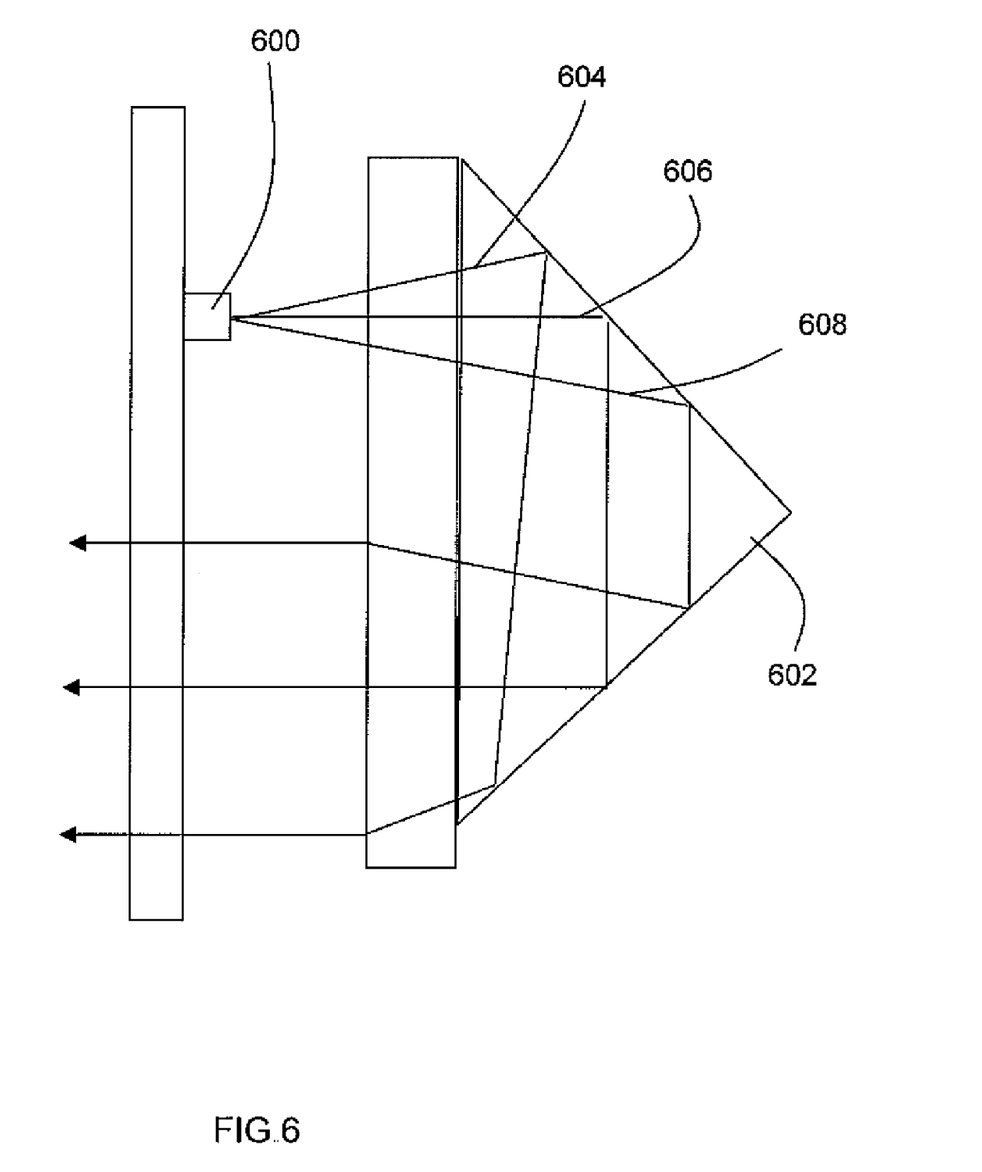
FIG. 6, is a plan view of a collimator prism with VCSEL, according to an embodiment.

Referring for a moment to FIG. 6, in at least one embodiment the VCSEL 600 is aligned with a reflector which is a collimator prism 602, such that VCSEL 600 is located outside the aperture of the vapor cell (e.g. vapor cell 302 in FIG. 3). As shown in FIG. 6, light emitted by VCSEL 600, such as light rays 604, 606 and 608, is reflected by collimator prism 602 and directed back toward a photodetector, such as photodetector 334 in FIG. 3. In summary, as discussed above the reflector may be a planar reflector, a curved reflector, or a prism.

Figure 7:
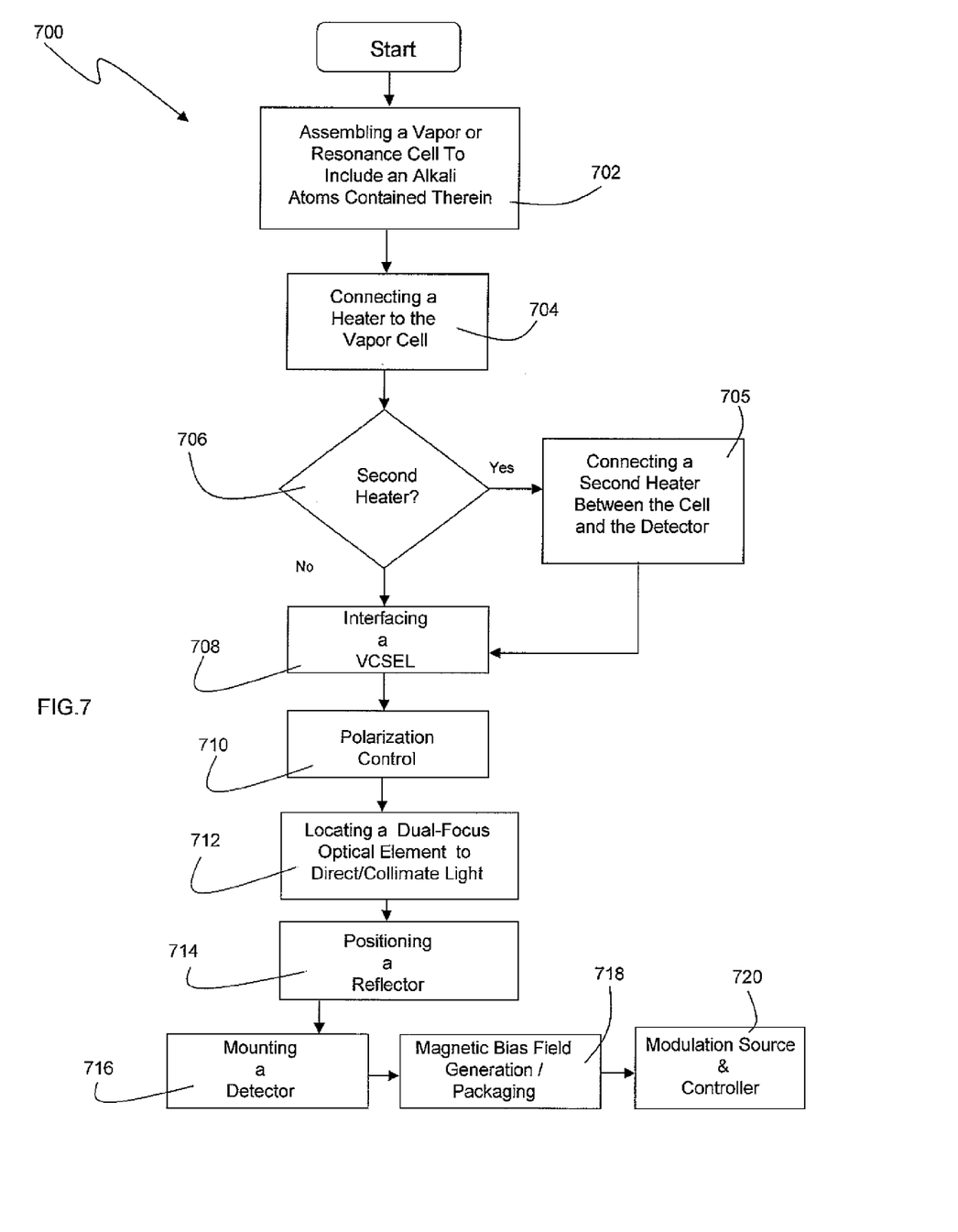
FIG. 7 is a flow chart of a method of manufacturing an atomic clock, according to an embodiment.

A simplified process 700 for manufacturing a physics package for an atomic clock of the present application is presented in FIG. 7. It should be understood that the sequence of steps presented in FIG. 7 is illustrative in nature, and alternate sequencing may be defined without departing from the scope and intent of this disclosure. Further, the manufacturing processes described herein may incorporate and take advantage of advances made in microelectromechanical fabrication techniques, used to manufacture chip-scale electronic components and subsystems.

An initial step in the manufacturing process is to select and assemble a vapor cell with gaseous alkali and buffer atoms contained therein, block 702. As noted above, the vapor cell may be manufactured of silicon with at least two windows made of Pyrex® or some other substantially transparent, alkali resistant material. Concurrent with, or subsequent to, the manufacture of the vapor cell is the integration of one or more heating elements, block 704. At least one heating element is positioned between the vapor cell and the VCSEL. A second heating element may be incorporated in close proximity to the second transparent window of the vapor cell, block 705. A decision as to whether to include a second heater, block 706, may be depend in part on the defined operating temperature of the vapor cell and VCSEL, and the need to better stabilize the temperature of the gaseous contents of the cell cavity. Heaters may be transparent and within the window clear aperture or opaque and outside the clear aperture.

Once the vapor cell and required heating elements are complete, the VCSEL must be integrated with the vapor cell (block 708) to establish a thermal conductance path between the two while maintaining optical transparency. The VCSEL may be mounted on a separate carrier or may be mounted directly to the vapor cell window. Polarization control, block 710, is included in the form of a waveplate or other means for establishing light polarization well known in the art.

Precisely locating a dual-focus optical element, block 712, is necessary to ensure that beam expansion on the first pass of light through the lens element, and the collimation of reflected light on the second pass through the element, is optimized. Collimation is particularly key in order to properly illuminate and excite the maximum volume possible of alkali atoms. A reflector is then positioned (block 714) to reflect light emitted from the VCSEL. The position and spacing of each component in the physics package of the atomic clock assembly is carefully defined and maintained in order to define a beam path for the emitted light that is adequate yet minimal in length. For example, the reflector must be located sufficiently apart from the VCSEL to ensure proper beam expansion and reflected beam collimation, yet close enough to provide the space savings desired for the overall system package Following location of the dual-focus optical element, the reflector, etc., the detector is mounted on the side of the vapor cell opposite the lens, reflector and VCSEL, block 716. Elements providing control of the intensity and polarization of the VCSEL illumination are located appropriately depending upon the specific embodiment desired. Magnetic field bias generation/component packaging (block 718) is followed by control electronics and a controller/micro-controller which are integrated into the atomic clock, as is the modulation source, block 720.

In operation, the physics package and atomic clock of the present disclosure are used to synchronize and precisely time GPS-based navigation systems, SatCom terminals, secure communication systems, and a whole host of electronic devices ranging in size from satellites to hand-held modules. More particularly, the vapor or resonance cell is heated to an operating temperature that may range from between approximately +40° C. to 120° C. Typical operating ranges may be on the order of 65-95° C. Heating to a temperature of approximately 75° C. generates a sufficient density of cesium atoms to ensure a proper signal-to-noise ratio for the clock. It rubidium is used, the operating temperature may be as high as 90° C. Concurrently, the VCSEL is heated to a temperature to achieve the desired wavelength of emitted light and temperature stabilized to the desired operating temperature.

The VCO generates a frequency which initially is unstable. This "modulation" frequency is used to modulate or vary the current input to the laser diode which is the VCSEL. Through a series of iterative steps using coherent population trapping ("CPT") or CPT excitation, the VCO is ultimately stabilized. More specifically two separate frequency components of the modulated light are generated, the two frequency components separated in frequency by the value of the atomic hyperfine splitting. The light is directed toward the dual focus optical element wherein the two light fields are simultaneously, expanded, and reflected off the reflector. Passing back through the dual-focus optical element and the quarter-wave waveplate, the light fields are collimated and circularly polarized Collectively the two light fields interrogate nearly the entire volume of alkali atoms in the vapor cell, exciting the atoms along the propagation path of each beam.

The absorption of light by the gaseous mixture in the vapor cell, which is measured by the detector, is dependent in part on the non-linear behavior of the excited atoms. The nonlinear absorption response is used to generate a difference signal to control the microwave modulation. The smaller the frequency difference, the lower the absorption of light by the cesium (or rubidium) atoms. The detector feeds a near continuous feedback signal to the controller, which sends an error signal to the VCO directing a modification in frequency. Ultimately, the output frequency of the VCO is sufficiently stabilized overall long periods of time, thereby becoming the output frequency of the atomic clock. In at least one embodiment, this enables an atomic clock having a total volume on the order of 1 cm$^3$, and a power consumption of approximately 30 mW produces timing signals with a fractional instability of about $1\times10^{-11}$ over an hour or more of optical integration.

Changes may be made in the above methods, devices and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, device and structure, which, as a matter of language, might be said to fall therebetween.

What is claimed is:

1. A chip-scale atomic clock, comprising:
    a vapor cell containing alkali atoms;
    an optical source positioned in close proximity to the vapor cell;

at least one heater element positioned in thermal contact with both the optical source and the vapor cell;
a reflector;
a dual-focus optical element structured and arranged to both direct light from the optical source toward the reflector and to collimate reflected light; and
a detector structured and arranged to detect once reflected light passing through the vapor cell to excite the alkali atoms.

2. The chip-scale atomic clock of claim 1, further comprising a polarization control element structured and arranged to achieve substantially circular polarization in the once reflected light.

3. The chip-scale atomic clock of claim 1, wherein the at least one heater element is a first heater element, and further wherein a second heater element is positioned between the vapor cell and the detector.

4. The chip-scale atomic clock of claim 1, wherein the alkali atoms are selected from a group consisting of: cesium and rubidium.

5. The chip-scale atomic clock of claim 1, wherein the dual-focus optical element is axially symmetric.

6. The chip-scale atomic clock of claim 5, wherein the dual-focus axially symmetric optical element is a micro-mini lens element.

7. The chip-scale atomic clock of claim 5, wherein the dual-focus axially symmetric optical element is a microlens-Fresnel lens element.

8. The chip-scale atomic clock of claim 1, wherein the optical source is a vertical cavity surface emitting laser ("VCSEL").

9. The chip-scale atomic clock of claim 1, further comprising an intensity control element.

10. The chip-scale atomic clock of claim 9, wherein the intensity control element is a neutral density filter.

11. The chip-scale atomic clock of claim 10, wherein the dual-focus optical element, neutral density filter and reflector are integrated into a single unit.

12. The chip-scale atomic clock of claim 1, wherein the at least one heater element is a transparent conductor.

13. The chip-scale atomic clock of claim 12, wherein the transparent conductor is selected from a group consisting of: Zinc Oxide and Indium Tin Oxide.

14. The chip-scale atomic clock of claim 1, further comprising:
a local oscillator structured and arranged to receive a control signal based on a detector output; and
a controller.

15. A method for manufacturing a physics package for an atomic clock comprising:
assembling a vapor cell containing alkali atoms;
integrating at least one heater to a first end of the vapor cell;
interfacing a vertical cavity surface emitting laser (VCSEL) with the first end of the vapor cell and the heater;
positioning a reflector in close proximity to the VCSEL to reflect light from the VCSEL into the vapor cell;
locating a dual-focus optical element between the VCSEL and the reflector to both direct the light toward the reflector and to collimate once reflected light; and
mounting a detector in close proximity to a second end of the vapor cell to detect the reflected light passing through the vapor cell to excite the alkali atoms.

16. The method of claim 15, wherein assembling a vapor cell further comprises encapsulating alkali atoms selected from a group consisting of: cesium and rubidium.

17. The method of claim 15, wherein the dual-focus optical element is selected from a group consisting of: a micro-mini lens element and a microlens-Fresnel lens element.

18. The method of claim 15, further comprising integrating a quarter-wave waveplate between the vapor cell and the dual-focus optical element to achieve substantially circular polarization in the once reflected light.

19. A physics package for an atomic clock comprising:
a containing means for containing a plurality of alkali atoms;
a generating means for generating a laser light:
a heating means positioned between the generating means and the containing means, for heating the generating means and the containing means;
a reflecting means for once reflecting the laser light toward the containing means;
an expanding and collimating means for expanding the laser light, directing the expanded laser light toward the reflecting means, and for collimating the once reflected laser light; and
a detecting means for detecting the once reflected laser light passing through the containing means to excite the alkali atoms.

20. The physics package of claim 19, wherein the containing means is a resonance cell manufactured of an alkali resistant material and having a pair of transparent windows for encapsulating the alkali atoms within a cavity of the cell.

21. The physics package of claim 20 where the cell material is Si and the two windows are substantially transparent at the operating wavelength and are alkali resistant.

22. The physics package of claim 19, wherein the generating means is a vertical cavity surface emitting laser.

23. The physics package of claim 19, wherein the expanding and collimating means is a dual-focus axially symmetric optical element.

24. The physics package of claim 23, wherein the dual-focus axially symmetric optic includes a first lens, which is a micro lens, integrated with a second lens.

25. The physics package of claim 24, wherein the micro-lens is selected from a group consisting of: a convex lens, a concave lens, and a diffractive lens.

26. The physics package of claim 24, wherein the second lens is a mini-lens.

27. The physics package of claim 26, wherein the mini-lens is selected from a group consisting of: a diffractive mini-lens, a refractive mini-lens; a Fresnel mini-lens, and a kiniform mini-lens.

28. A dual-focus optical element for a compact optical clock, which provides substantially collimated light from an optical source and through which light passes twice, comprising:
a first section for producing expansion of a light beam striking the element;
a single reflector device to direct the light back through the optical element; and
a second section for collimating the beam of light directed toward the second section by the reflector device, where the first section and the second section are on a common substrate.

29. The dual-focus optical element of claim 28, wherein the first section further comprises a micro-lens.

30. The dual-focus optical element of claim 29, wherein the micro-lens is selected from a group consisting of: a convex micro-lens, a concave micro-lens, and a diffractive micro-lens.

31. The dual-focus optical element of claim 28, wherein the second section further comprises a mini-lens.

32. The dual-focus optical element of claim 31, wherein the mini-lens is selected from a group consisting of: a diffractive mini-lens, a refractive mini-lens;

a Fresnel mini-lens, and a kiniform mini-lens.

33. The dual-focus optical element of claim 28, wherein the element is axially symmetric.

34. The dual-focus optical element of claim 28, wherein the element is axially asymmetric.

35. The dual-focus optical element of claim 28, wherein the first and the second sections are manufactured from materials selected from a group consisting of: glass, ceramic, and polymer compound materials.

36. The dual-focus optical element of claim 28, wherein the reflector is selected from a group consisting of: a planar reflector, a curved reflector, and a prism.

37. The dual-focus optical element of claim 28, wherein the element is fabricated using techniques selected from a group consisting of: microlens processing; grayscale lithography; and fine-scale mechanical turning.

* * * * *